United States Patent
Huang

(10) Patent No.: US 11,036,888 B2
(45) Date of Patent: Jun. 15, 2021

(54) METHOD FOR PROTECTING PDF DOCUMENT PAGE-BY-PAGE

(71) Applicant: FUJIAN FOXIT SOFTWARE DEVELOPMENT JOINT STOCK CO., LTD., Fuzhou (CN)

(72) Inventor: Peng Huang, Fuzhou (CN)

(73) Assignee: FUJIAN FOXIT SOFTWARE DEVELOPMENT JOINT STOCK CO., LTD, Fuzhou (CN)

( * ) Notice: Subject to any disclaimer, the term of this patent is extended or adjusted under 35 U.S.C. 154(b) by 226 days.

(21) Appl. No.: 16/309,172

(22) PCT Filed: Apr. 25, 2017

(86) PCT No.: PCT/CN2017/000322
§ 371 (c)(1),
(2) Date: Dec. 12, 2018

(87) PCT Pub. No.: WO2018/006576
PCT Pub. Date: Jan. 11, 2018

(65) Prior Publication Data
US 2019/0251231 A1   Aug. 15, 2019

(30) Foreign Application Priority Data
Jul. 6, 2016   (CN) .......................... 201610528714.9

(51) Int. Cl.
*H04L 9/08* (2006.01)
*G06F 21/10* (2013.01)
(Continued)

(52) U.S. Cl.
CPC .............. *G06F 21/64* (2013.01); *G06F 21/10* (2013.01); *G06F 21/602* (2013.01); *H04L 9/088* (2013.01);
(Continued)

(58) Field of Classification Search
CPC ........ G06F 21/10; G06F 40/14; G06F 21/602; G06F 21/64; H04L 9/0819; H04L 9/088; H04L 9/0894
(Continued)

(56) References Cited

U.S. PATENT DOCUMENTS 7,693,813 B1 * 4/2010 Cao .......................... G06F 16/93
707/999.001
8,311,946 B1 * 11/2012 Warnock .............. G06Q 20/145
705/52
(Continued)

FOREIGN PATENT DOCUMENTS

CN   101702150   5/2010
CN   102710761   10/2012
(Continued)

OTHER PUBLICATIONS

International Search Report filed in PCT/CN2017/000322 dated Jul. 28, 2017.

*Primary Examiner* — Kambiz Zand
*Assistant Examiner* — Phuc Pham
(74) *Attorney, Agent, or Firm* — Rankin, Hill & Clark LLP

(57) ABSTRACT

A method for protecting a PDF document page-by-page, including the following steps: traversing all the page content stream objects in the PDF document, if any one page content stream object is reused by a plurality of pages, copying the content stream object according to the number of times of same being used; establishing an index table from a PDF page number to the page content stream object in a memory; searching for, according to the page number of the protected page, the corresponding page content stream object from the index table; encrypting stream data of the acquired page content object using the secret key B; adding an encryption identification C to an object dictionary of the encrypted page (Continued)

stream object; respectively creating a cover layer with the same length and width as various protected pages; and placing various cover layers on the top of the protected page.

3 Claims, 2 Drawing Sheets

(51) Int. Cl.
*G06F 21/60* (2013.01)
*G06F 21/64* (2013.01)

(52) U.S. Cl.
CPC .......... *H04L 9/0819* (2013.01); *H04L 9/0894* (2013.01); *H04L 2209/603* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 2002/0099947 | A1* | 7/2002 | Evans | G06F 21/6209 713/193 |
| 2004/0143794 | A1* | 7/2004 | Sugimoto | G06F 40/103 715/251 |
| 2004/0196496 | A1* | 10/2004 | Klassen | G06F 3/124 358/1.15 |
| 2005/0125722 | A1* | 6/2005 | Mistry | G06F 21/10 715/251 |
| 2007/0061889 | A1* | 3/2007 | Sainaney | H04L 9/3271 726/26 |
| 2007/0208743 | A1* | 9/2007 | Sainaney | G06F 16/9535 |
| 2008/0077530 | A1* | 3/2008 | Banas | G06Q 10/06313 705/50 |
| 2008/0147790 | A1* | 6/2008 | Malaney | G06Q 10/00 709/203 |
| 2010/0202015 | A1* | 8/2010 | Misawa | H04N 1/00331 358/1.15 |
| 2012/0226823 | A1* | 9/2012 | Livnat | G06F 21/62 709/246 |

FOREIGN PATENT DOCUMENTS

| | | |
|---|---|---|
| CN | 102819704 | 12/2012 |
| CN | 103577723 | 2/2014 |
| CN | 103595698 | 2/2014 |
| JP | 2010157013 | 7/2010 |

* cited by examiner

METHOD FOR PROTECTING PDF DOCUMENT PAGE-BY-PAGE

FIELD OF THE INVENTION

The present invention relate to the technical field of digital rights management, and particularly to a method for protecting a PDF document page-by-page.

BACKGROUND

Digital Rights Management (DRM) realizes protection of digital contents with a certain calculation method, to prevent illegal copying of the digital contents or to make copying difficult or costly, so that a user must be authorized to use the digital contents finally, and the use of digital contents by the user is performed under the constraints specified by a DRM system.

At present, because the PDF document is protected by performing overall protection or authorization on the whole document in general, it is impossible to perform individual copyright protection only on some contents of the document according to requirements. However, for some application requirements, it is often not necessary to pursue absolute security of the whole document, but a user may only hope to protect some contents of the document, or the user may see more contents only after performing certain operations, for example, may see more contents by registering or participating in user surveys.

Because of having a very clear concept of logical pages, the PDF document can be protected by taking logical pages as units. When some contents in the PDF document are protected, in general, it is necessary to split the original document, for example, each page is split into a document, and then the original PDF pages are protected in a method of protecting individual PDF documents. However, this method has a technical problem that the split page documents cannot be managed uniformly, so that it is inconvenient to distribute the documents.

SUMMARY

The present invention provides a method for protecting a PDF document page-by-page, to protect some pages of a PDF document.

To achieve the above object, the present invention provides a method for protecting a PDF document page-by-page, comprising the following steps:

S11: Writing a unique identifier A into a PDF document;

S12: Randomly generating a secret key B, uploading the unique identifier A and the secret key B to a server, and storing the secret key B in the server by taking the unique identifier A as an index;

S13: Traversing all page content stream objects in the PDF document, if a certain page content stream object is reused by a plurality of pages, copying the page content stream object according to the number of times that the page content stream object is reused, so that each page corresponds to an individual page content stream object;

S14: Establishing, in a memory, an index table from PDF page numbers to the page content stream objects;

S15: Searching for, according to a page number of a protected PDF page, a corresponding page content stream object from the index table;

S16: Encrypting stream data of the page content stream object searched in the previous step S15, by using the secret key B; and if the stream data further refers to another form object, then not encrypting the form object;

S17: Adding an encryption identifier C to an object dictionary of the encrypted page content stream object obtained in the previous step S16;

S18: Because sizes of various protected PDF pages are different, respectively creating a cover layer with the same length and the same width as each of the various protected PDF pages, and naming all cover layers on the PDF pages as D; and S19: Placing the cover layers on the top of the protected PDF pages respectively.

In one embodiment of the present invention, the cover layers are provided with text characters predefined by a document owner.

The present invention also provides a method for opening the PDF document protected according to the method for protecting a PDF document page-by-page, comprising the following steps:

S21: Traversing all page content stream objects in the PDF document, and judging, one by one, whether each page content stream object has the encryption identifier C;

S22: If the encryption identifier C does not exist in a page content stream object corresponding to a PDF page, indicating that the PDF page is not encrypted, and then directly parsing and displaying the PDF page;

S23: If the encryption identifier C does exist in a page content stream object corresponding to a PDF page, indicating that the PDF page is encrypted, acquiring the secret key B from the server according to the unique identifier A in the PDF document, decrypting the page content stream object by using the secret key B, and parsing and displaying the PDF page; and S24: Removing the cover layers named as D on the protected PDF page.

The method for protecting a PDF document page-by-page can perform individual protection on some pages in the PDF document, and can guarantee the integrity of distribution of the PDF document, thereby facilitating unified management, and having strong practical value.

BRIEF DESCRIPTION OF THE DRAWINGS

In order to more clearly explain the embodiments of the present invention or the technical solution in the prior art, the embodiments or drawings required in the description of the prior art will be briefly introduced below. Obviously, the drawings in the description below are only some embodiments of the present invention. Those ordinary skilled in the art may also obtain other drawings without contributing creative labor.

DETAILED DESCRIPTION OF THE PREFERRED EMBODIMENTS

The technical solution in the embodiment of the present invention will be described clearly and completely below in combination with the drawings in the embodiments of the present invention. Obviously, the described embodiments are only a part of the embodiments of the present invention, but not all of the embodiments. Based on the embodiments of the present invention, all other embodiments obtained by those ordinary skilled in the art without contributing creative labor belong to the protection scope of the present invention.

Figure 1:
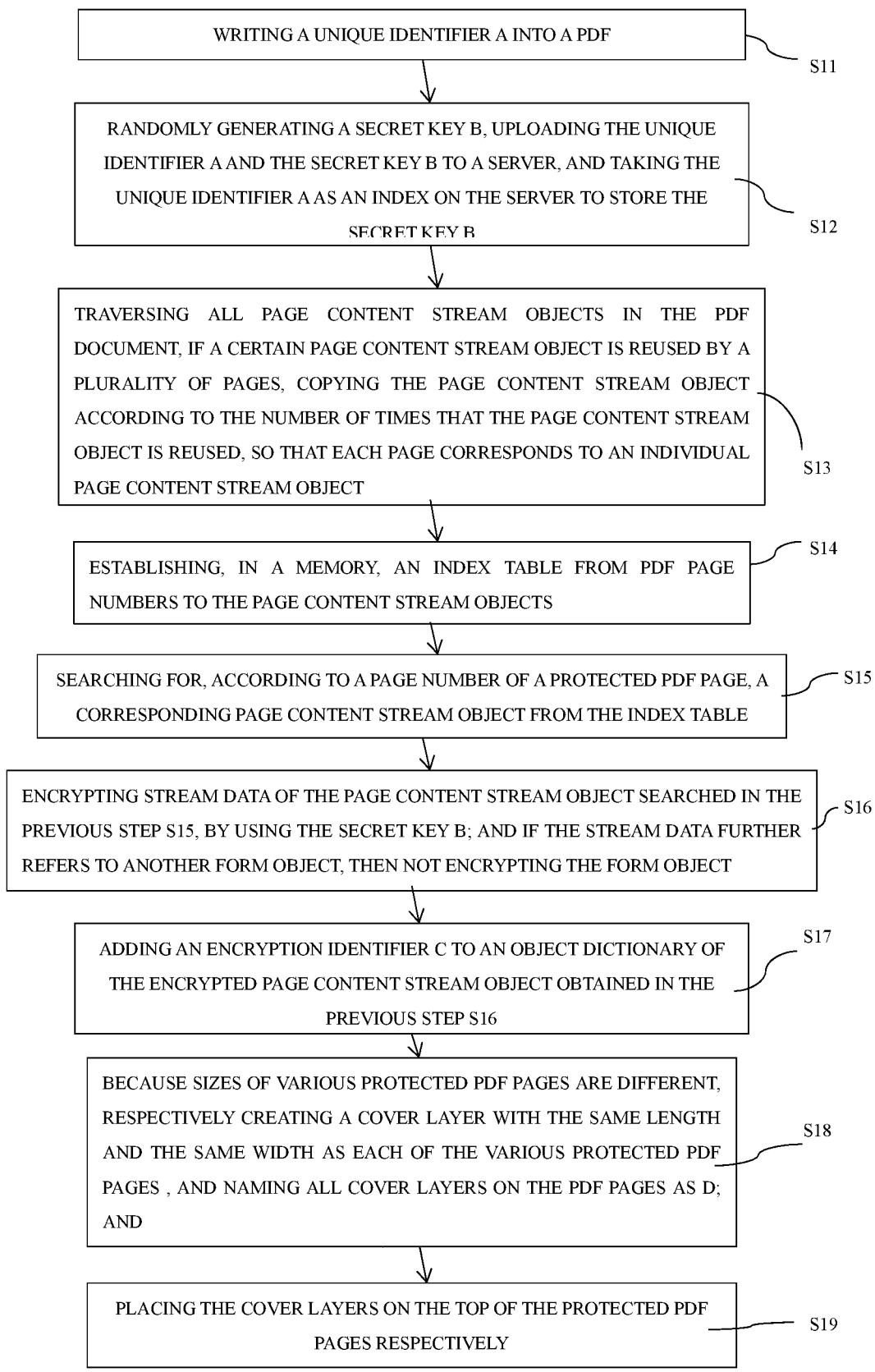
FIG. 1 is a flow chart showing a method for protecting a PDF document page-by-page provided in the present invention.

FIG. 1 is a flow chart showing a method for protecting a PDF document page-by-page provided in the present invention, as shown in the Figure, the method for protecting a PDF document page-by-page of the present invention comprising the following steps:

S11: Writing a unique identifier A into a PDF document;

S12: Randomly generating a secret key B, uploading the unique identifier A and the secret key B to a server, and storing the secret key B in the server by taking the unique identifier A as an index;

S13: Traversing all page content stream objects in the PDF document, if a certain page content stream object is reused by a plurality of pages, copying the page content stream object according to the number of times that the page content stream object is reused, so that each page corresponds to an individual page content stream object;

S14: Establishing, in a memory, an index table from PDF page numbers to the page content stream objects;

S15: Searching for, according to a page number of a protected PDF page, a corresponding page content stream object from the index table;

S16: Encrypting stream data of the page content stream object searched in the previous step S15, by using the secret key B; and if the stream data further refers to another form object, then not encrypting the form object;

In this way, although absolute security of all data on the PDF pages is not guaranteed, a process of encryption and a process of decryption can be simple enough, and would be very suitable for protection scenarios with low security requirements;

S17: Adding an encryption identifier C to an object dictionary of the encrypted page content stream object obtained in the previous step S16;

S18: Because sizes of various protected PDF pages are different, respectively creating a cover layer with the same length and the same width as each of the various protected PDF pages, and naming all cover layers on the PDF pages as D;

wherein the cover layers may be provided with text characters predefined by a document owner; the cover layers are used to cover original contents on the PDF pages, formats of the cover layers fully conform to a format standard of an open layer the PDF format, so that the cover layers may be removed by the user; however, because the page content steam object is encrypted, data of the PDF pages may be displayed as garbled characters;

S19: Placing the cover layers on the top of the protected PDF pages respectively.

Figure 2:
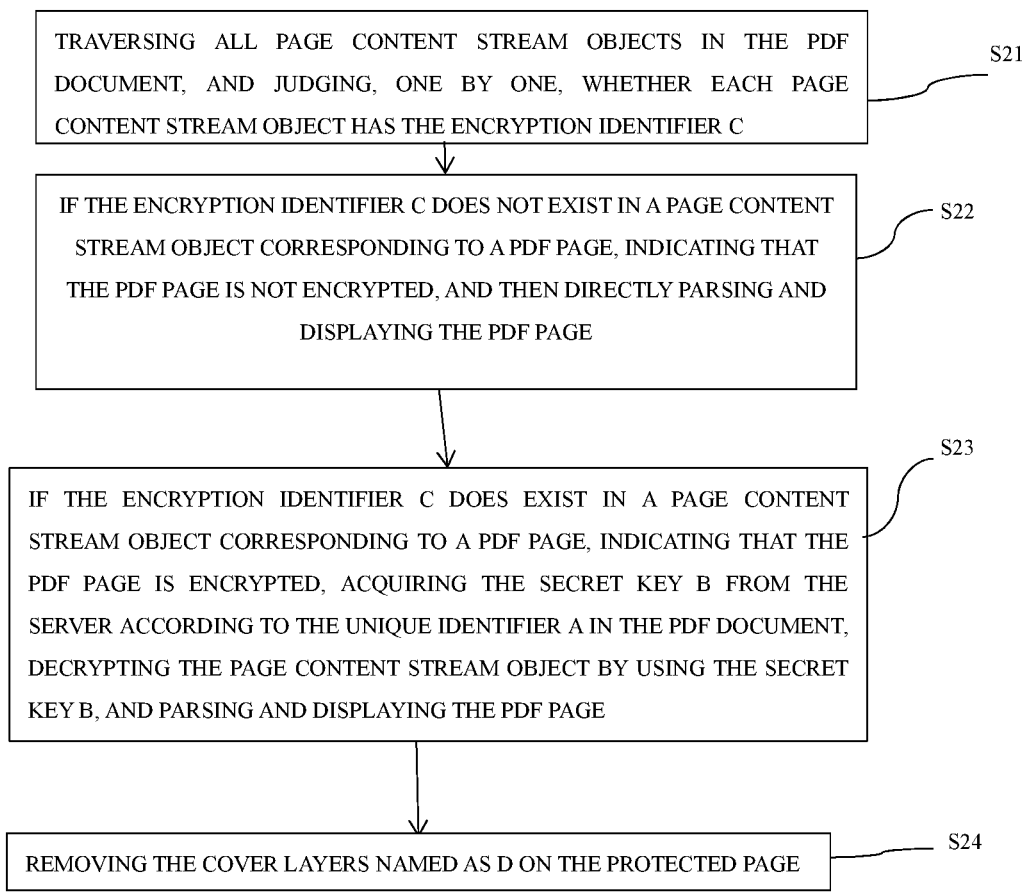
FIG. 2 is a flow chart showing a method for opening the PDF document protected according to the method for protecting a PDF document page-by-page provided in the present invention.

The present invention also provides a method for opening the PDF document protected according to the method for protecting a PDF document page-by-page, as shown in FIG. 2, the method comprising the following steps:

S21: Traversing all page content stream objects in the PDF document, and judging, one by one, whether each page content stream object has the encryption identifier C;

S22: If the encryption identifier C does not exist in a page content stream object corresponding to a PDF page, indicating that the page is not encrypted, and then directly parsing and displaying the page;

S23: If the encryption identifier C does exist in a page content stream object corresponding to a PDF page, indicating that the page is encrypted, acquiring the secret key B from the server according to the unique identifier A in the PDF document, decrypting the page content stream object by using the secret key B, and parsing and displaying the PDF page; and S24: Removing the cover layers named as D on the protected PDF page.

The method for protecting a PDF document page-by-page can perform individual protection on some pages in the PDF document, and can guarantee an integrity during distributing the PDF document, thereby facilitating unified management of the PDF document, and having a strong practical value.

It will be understood by those ordinary skilled in the art that: the drawings are only schematic diagrams of one embodiment, and the modules or processes in the drawings are not necessarily required for implementation of the present invention.

It will be understood by those ordinary skilled in the art that the modules in the device of the embodiment may be distributed in the device of the embodiment according to the description of the embodiment, or may be located in one or more devices different from that of the present embodiment by making corresponding changes. The modules of the above embodiment may be combined into one module or may be further split into multiple sub-modules.

Finally, it should be noted that: the above embodiments are only used for explaining the technical solution of the present invention, but are not used for limiting same; although the present invention is described in detail with reference to the foregoing embodiments, it will be understood by those skilled in the art that modifications may be made to the technical solutions described in the foregoing embodiments, or equivalent replacements may be made to some of the technical features thereof; and these modifications or replacements do not make the essence of corresponding technical solutions depart from spirit and scope of technical solution of the embodiments of the present invention.

The invention claimed is:

1. A method for protecting a PDF document page-by-page, comprising:

S11: writing a unique identifier A into a PDF document;

S12: randomly generating a secret key B, uploading the unique identifier A and the secret key B to a server, and taking the unique identifier A as an index on the server to store the secret key B;

S13: traversing all page content stream objects in the PDF document, if a certain page content stream object is reused by a plurality of pages, copying the page content stream object according to the number of times that the page content stream object is reused, so that each page corresponds to an individual page content stream object;

S14: establishing, in a memory, an index table from PDF page numbers to the page content stream objects;

S15: searching for, according to a page number of a protected PDF page, a corresponding page content stream object from the index table;

S16: encrypting stream data of the page content stream object searched in the previous step S15, by using the secret key B; and if the stream data further refers to another form object, then not encrypting the form object;

S17: adding an encryption identifier C to an object dictionary of the encrypted page content stream object obtained in the previous step S16;

S18: because sizes of various protected PDF pages are different, respectively creating a cover layer with the same length and the same width as each of the various protected PDF pages, and naming all cover layers on the PDF pages as D; and S19: placing the cover layers on the top of the protected PDF pages respectively.

2. The method for protecting a PDF document page-by-page according to claim 1, wherein, the cover layers are provided with text characters predefined by a document owner.

3. A method for protecting a PDF document page-by-page and opening the PDF document, comprising:

S11: writing a unique identifier A into a PDF document;

S12: randomly generating a secret key B, uploading the unique identifier A and the secret key B to a server, and taking the unique identifier A as an index on the server to store the secret key B;

S13: traversing all page content stream objects in the PDF document, if a certain page content stream object is reused by a plurality of pages, copying the page content stream object according to the number of times that the page content stream object is reused, so that each page corresponds to an individual page content stream object;

S14: establishing, in a memory, an index table from PDF page numbers to the page content stream objects;

S15: searching for, according to a page number of a protected PDF page, a corresponding page content stream object from the index table;

S16: encrypting stream data of the page content stream object searched in the previous step S15, by using the secret key B; and if the stream data further refers to another form object, then not encrypting the form object;

S17: adding an encryption identifier C to an object dictionary of the encrypted page content stream object obtained in the previous step S16;

S18: because sizes of various protected PDF pages are different, respectively creating a cover layer with the same length and the same width as each of the various protected PDF pages, and naming all cover layers on the PDF pages as D;

S19: placing the cover layers on the top of the protected PDF pages respectively;

S21: traversing all page content stream objects in the PDF document, and judging, one by one, whether each page content stream object has the encryption identifier C;

S22: if the encryption identifier C does not exist in a page content stream object corresponding to a PDF page, indicating that the PDF page is not encrypted, and then directly parsing and displaying the PDF page;

S23: if the encryption identifier C does exist in a page content stream object corresponding to a PDF page, indicating that the PDF page is encrypted, acquiring the secret key B from the server according to the unique identifier A in the PDF document, decrypting the page content stream object by using the secret key B, and parsing and displaying the PDF page; and S24: removing the cover layers named as D on the protected page.

* * * * *